United States Patent
Takahara

(10) Patent No.: US 9,289,953 B2
(45) Date of Patent: Mar. 22, 2016

(54) TIRE REPAIR DEVICE AND TIRE REPAIR METHOD USING THE SAME

(71) Applicant: The Yokohama Rubber Co., LTD., Minato-ku, Tokyo (JP)

(72) Inventor: Hideyuki Takahara, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/389,531

(22) PCT Filed: Apr. 11, 2013

(86) PCT No.: PCT/JP2013/060900
§ 371 (c)(1),
(2) Date: Sep. 30, 2014

(87) PCT Pub. No.: WO2013/157469
PCT Pub. Date: Oct. 24, 2013

(65) Prior Publication Data
US 2015/0059920 A1 Mar. 5, 2015

(30) Foreign Application Priority Data
Apr. 16, 2012 (JP) .................... 2012-093081

(51) Int. Cl.
| | | |
|---|---|---|
| B65B 31/00 | (2006.01) |
| B29C 73/02 | (2006.01) |
| B29C 73/16 | (2006.01) |
| B29C 73/24 | (2006.01) |
| B65D 25/20 | (2006.01) |
| B60C 29/06 | (2006.01) |
| B65D 5/50 | (2006.01) |

(52) U.S. Cl.
CPC ............. *B29C 73/025* (2013.01); *B29C 73/166* (2013.01); *B29C 73/24* (2013.01); *B60C 29/062* (2013.04); *B65D 5/50* (2013.01); *B65D 25/20* (2013.01)

(58) Field of Classification Search
CPC .. B29C 73/025; B29C 73/166; B60C 29/062; B65D 5/50; B65D 25/20
USPC ...................... 141/38, 313, 104, 105; 137/223
See application file for complete search history.

(56) References Cited

U.S. PATENT DOCUMENTS

2012/0312387 A1* 12/2012 Sekiguchi ................. 137/15.04

FOREIGN PATENT DOCUMENTS

| | | |
|---|---|---|
| JP | H06-006089 | 1/1994 |
| JP | H06-045395 | 11/1994 |
| JP | 2000-309254 | 11/2000 |
| JP | 2001-063722 | 3/2001 |
| JP | 2010-120250 | 6/2010 |
| JP | 2010-234795 | 10/2010 |

OTHER PUBLICATIONS

International Seach Report for International Application No. PCT/JP2013/060900 dated Jul. 23, 2013, 4 pages, Japan.

* cited by examiner

*Primary Examiner* — Jason K Niesz
(74) *Attorney, Agent, or Firm* — Thorpe North & Western

(57) ABSTRACT

A tire repair device, which has a container for containing the tire repair fluid and a securing jig therefor, is characterized in that the securing jig is configured by coupling a securing portion, which holds the container in a predetermined direction, to a step plate portion.

16 Claims, 8 Drawing Sheets

(a)

(b)

(c)

(d)

(a)

(b)

(c)

(d)

TIRE REPAIR DEVICE AND TIRE REPAIR METHOD USING THE SAME

TECHNICAL FIELD

The present technology relates to a tire repair device and a tire repair method, and in particular to a tire repair device configured to be able to secure a tire repair fluid container in a stable manner with a simple configuration, and a tire repair method using the same.

BACKGROUND

A tire repair device (tire repair kit) is recently known that temporarily repairs a puncture and fills the inside of the tire with air at the same time by injecting a tire repair fluid and compressed air into the tire when a pneumatic tire mounted on a vehicle has punctured. Resource saving and reduction in vehicle weight can be achieved through the use of such a tire repair device because a spare tire does not need to be mounted in the vehicle. There is also an advantage that a space for mounting the spare tire can be used for another purpose.

As illustrated in FIG. 8, for example, this tire repair method involves connecting a compressor 10 to a container 2 containing the tire repair fluid, then compressing the inside of the container 2 by supplying compressed air from the compressor 10 to the container 2, and then injecting the tire repair fluid and the compressed air from a tire valve 22 of a wheel 21 mounted on a tire 20 into the tire. The container 2 needs to be secured in a stable attitude so as not to fall over or tilt while injecting the tire repair fluid into the tire. Consequently, Japanese Unexamined Patent Application Publication No. 2010-120250 proposes securing the container 2 to a side surface of the compressor by providing a surface fastener 30 between the outer side of the container 2 and the outer side of the compressor 10. According to this tire repair method, the container 2 can be secured in a stable attitude while injecting the tire repair fluid into the tire.

However, there is a need to newly prepare and mount a container containing the tire repair fluid and a fastener needs to be provided on the outer side surface of the new container each time this type of tire repair device is used for conducting a tire repair. As a result, a tire repair device that is more versatile with a simple configuration and a tire repair method that uses the same are desired.

SUMMARY

The present technology provides a tire repair device configured to be able to secure a tire repair fluid container in a stable manner with a simple configuration, and a tire repair method using the same.

A tire repair device of the present technology is characterized by having a container for containing tire repair fluid and a securing jig for securing the container, the securing jig being configured by coupling a securing portion for holding the container in a predetermined direction to a step plate portion.

A tire repair method of the present technology involves using the above-mentioned tire repair device, connecting to the container a discharge pipe for discharging tire repair fluid and an intake pipe for introducing compressed air, mounting the container onto the securing portion and securing the securing jig and the container by mounting a compressor on the step plate portion, connecting the discharge pipe to a tire valve of a wheel assembled on a tire with an injection hose, connecting the compressor to the intake pipe of the container, and supplying compressed air from the compressor to the container, whereby the inside of the container is compressed and the tire repair fluid is injected into the tire.

The tire repair device of the present technology is able to secure the tire repair fluid container in a stable manner with a simple configuration due to the container for containing the tire repair fluid being mounted in the securing portion of the securing jig and another object such as a compressor being placed on the step plate portion of the securing jig thereby simply securing the container.

The securing jig is preferably expandable on a flat surface or foldable so that the volume of the securing jig can be reduced when mounted in a vehicle.

The securing jig is configured by a plurality of flat members configured by folding a flat plate a plurality of times, and the step plate portion can be made from a flat member of an end portion of the flat plate. The securing portion can be configured by opening a hole into which the container is inserted in one of the plurality of flat members. Moreover, the securing jig is able to have a base portion for placing the container on one of the plurality of flat members.

A height h of the securing portion of the securing jig is preferably from 20 to 90% of the height H of the container when held in a predetermined direction, whereby the container can be secured in a stable manner even if the amount of the tire repair fluid inside the container is small when repairing a puncture.

The tire repair method of the present technology enables the tire repair to be conducted easily and assuredly through the use of a tire repair device configured by having a container containing the tire repair fluid and a securing jig for securing the container, with the securing jig configured by coupling a step plate portion with a securing portion for holding the container in a predetermined direction, whereby the tire repair fluid container is secured in a stable manner and the tire repair fluid can be injected into the inside of the tire along with compressed air supplied by a compressor.

The securing jig is preferably expandable on a flat surface or foldable and the volume of the securing jig can be reduced.

A securing jig made up of a plurality of flat members configured by folding a flat plate a plurality of times and in which the step plate portion is a flat member of an end portion of a flat plate can be used as the securing jig. A securing jig provided with a hole into which the container is inserted in one of the plurality of flat members as the securing portion can be used. Moreover, the container can be used by providing a base portion for placing the container on one of the plurality of flat members of the securing jig.

A height h of the securing portion of the securing jig is preferably from 20 to 90% of the height H of the container when the container is held in a predetermined direction, whereby the container can be secured in a stable manner even if the amount of the tire repair fluid inside the container is small when repairing a puncture.

DETAILED DESCRIPTION

Figure 1:
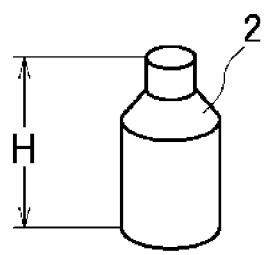
FIGS. 1A to 1D are perspective views exemplifying an embodiment of a tire repair device of the present technology, with FIG. 1A being an overview of a container, FIG. 1B being an overview of a securing jig, FIG. 1C being an overview of a form with the container mounted in the securing jig, and FIG. 1D being an overview of a form with the securing jig secured with another object.
Figure 1:
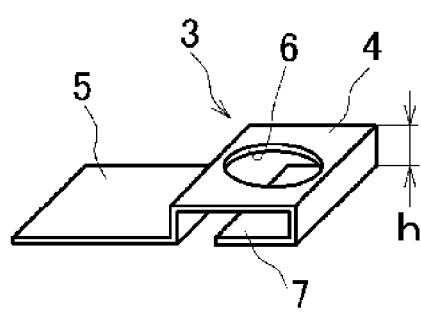
Figure 1:
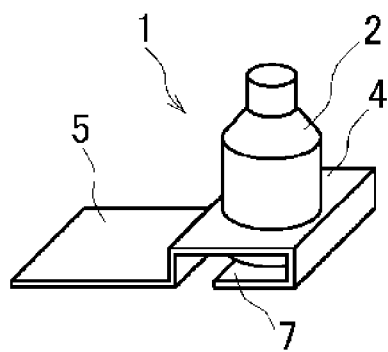
Figure 1:
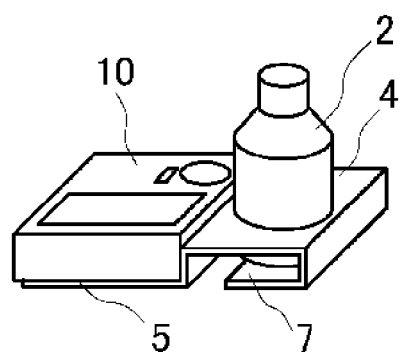

The tire repair device of the present technology includes at least a container for containing a tire repair fluid, and a securing jig for mounting the container. Moreover, equipment such as a compressor to be used when performing a tire repair and components such as various hoses, a cap, and a connecting pipe can be provided.

FIGS. 1A to 1D are explanatory views exemplifying a configuration of the tire repair device of the present technology.

FIG. 1A illustrates a container 2 for containing the tire repair fluid. So long as the container 2 is a container with good air tightness, chemical resistance, and pressure resistance, a container normally used for containing the tire repair fluid may be used. The container 2 is loaded on a vehicle in a state in which an opening is sealed by a sealing member and the like, and when a tire repair fluid injection operation is performed, the sealing member is removed, and a discharge pipe for discharging the tire repair fluid and an intake pipe for introducing compressed air are connected to the opening whereby the container 2 is used.

A securing jig 3 in FIG. 1B is configured by coupling a step plate portion 5 with a securing portion 4 for holding the container 2 in a predetermined direction. A hole 6 is formed substantially in a middle part in the securing portion 4 for mounting the container 2. The securing portion 4 may have a base portion 7 for placing the container 2 thereon. By placing the container 2 on the base portion 7, the container 2 can be secured in a stable manner. The step plate portion 5 is formed in a flat plate shape so that another object such as a compressor can be placed thereon.

The material for forming the securing jig 3 is not limited in particular and may be exemplified by a sheet or a plate made from, for example, metal, plastic, paper and the like. Among these materials, a type of paper such as thick paper or cardboard is preferable. By coating these types of papers, work may be performed easily on a wet road or in the rain.

In FIG. 1C, the container 2 is mounted in the securing portion 4 of the securing jig 3, placed on the base portion 7, and held in a predetermined direction. While the container 2 is held so that the opening of the container 2 is standing substantially upright in the example in FIG. 1C, the direction for holding the container 2 is not limited to this example. For example, the container 2 may be held in a substantially vertical direction with the opening of the container 2 at the bottom, or a substantially horizontal direction, or a tilted direction tilted to a certain angle, whereby the container 2 can be held in a direction that enables the effective discharge of the tire repair fluid.

The container 2 mounted on the securing jig 3 can be secured easily and assuredly by placing another object such as a compressor 10 on the step plate portion 5 of the securing jig 3 as exemplified in FIG. 1D. The other object is not limited to a compressor as long as the dead weight of the object is enough to secure the securing jig 3 and the container 2 when placed on the step plate portion 5. Tools or a toolbox loaded in the vehicle or even a block or a large stone near where the work is being performed may be used as the other object. Furthermore, an operator may stand on the step plate portion 5 to secure the securing jig 3 while injecting the tire repair fluid.

Figure 2:
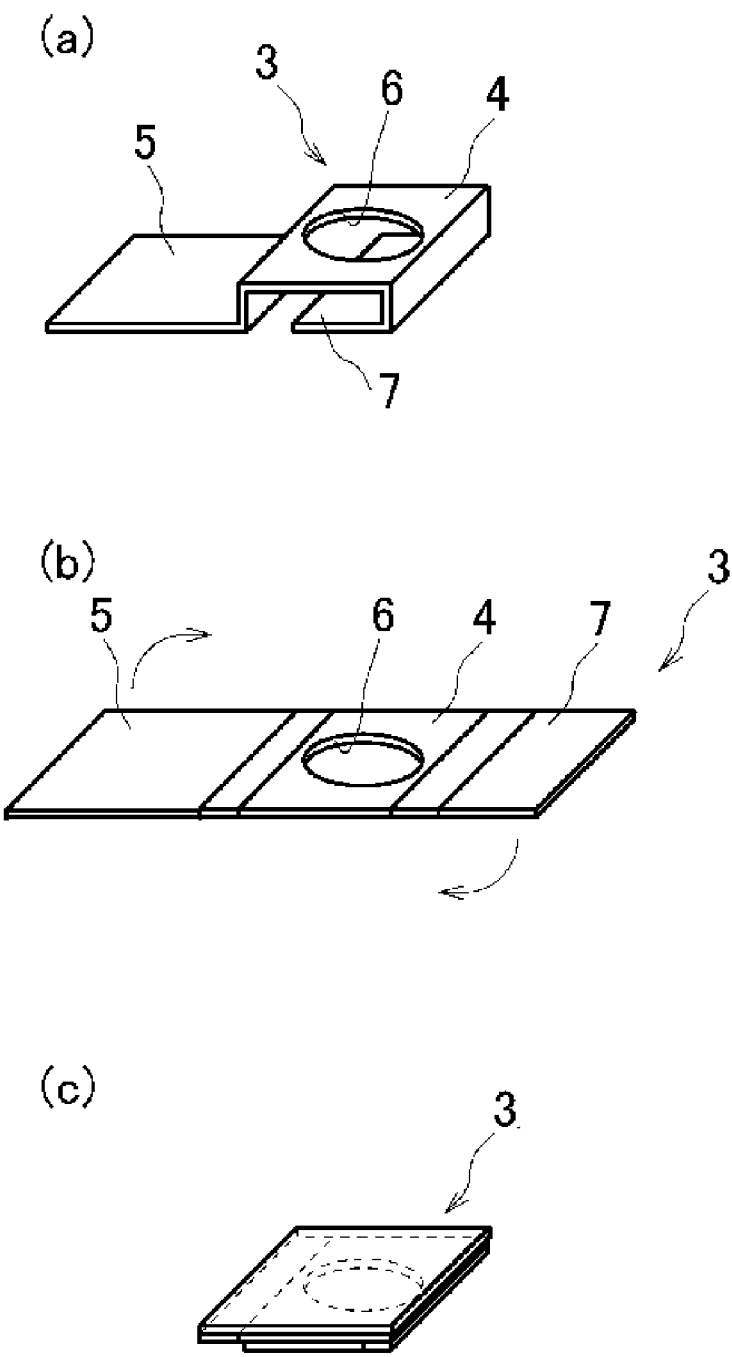
FIGS. 2A to 2C are perspective views exemplifying an embodiment of a securing jig that configures the present technology, with FIG. 2A being an overview of a form of the securing jig when used, FIG. 2B being an overview of a form of the securing jig when expanded, and FIG. 2C being an overview of a form of the securing jig when folded.
Figure 3:
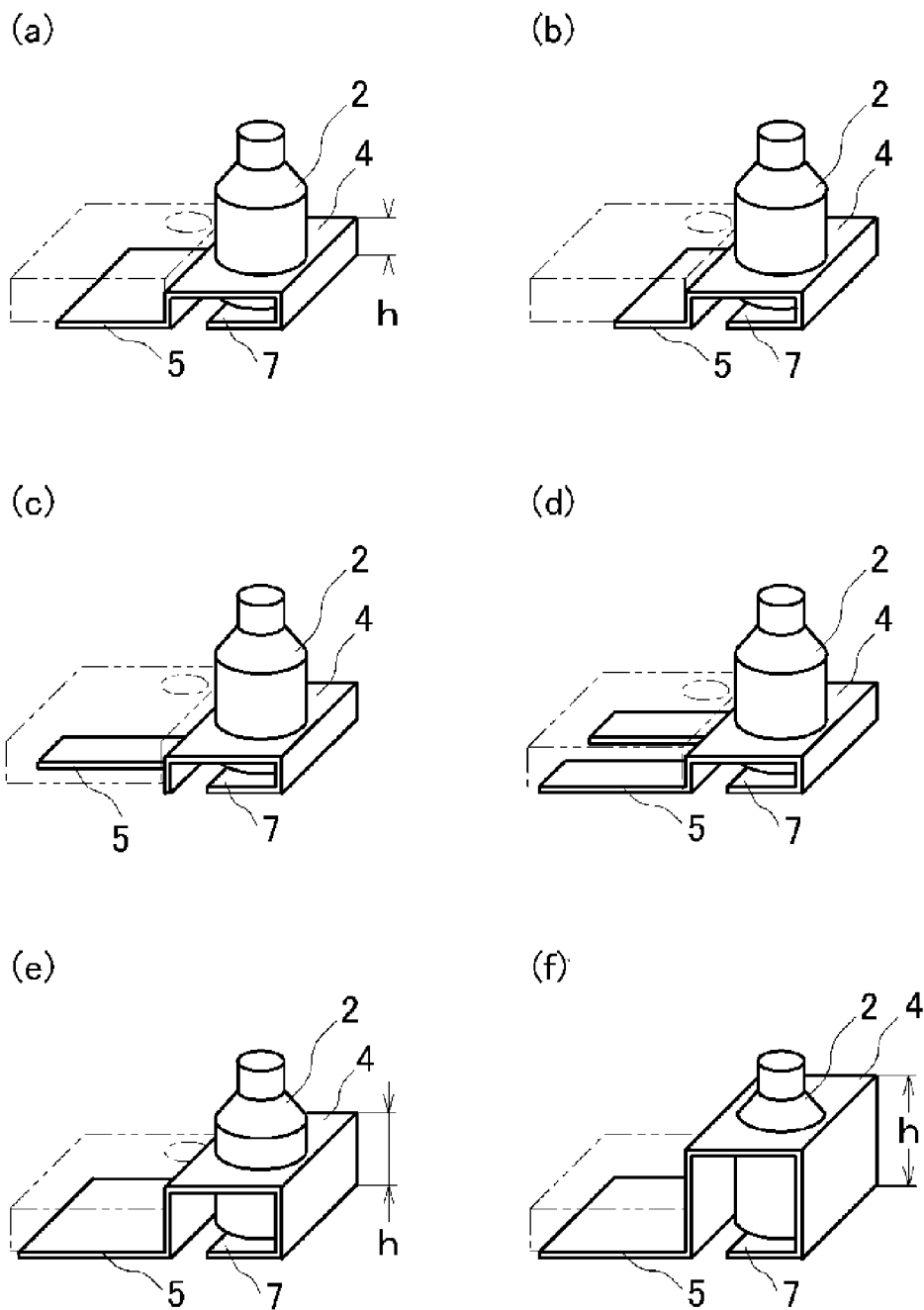
FIGS. 3A to 3F are perspective views illustrating other examples of embodiments of the tire repair device of the present technology.

The securing jig in the present technology as illustrated in FIGS. 2A to 2C is preferably expandable on a flat surface or is preferably foldable in order to reduce space when loaded into a vehicle. FIG. 2A is a form when the securing jig 3 is being used. FIG. 2B is a form when the securing jig 3 in FIG. 2A is expanded on a flat surface, and then the securing jig 3 can be folded in a compact manner as illustrated in FIG. 2C by folding the securing jig 3 in the direction of the arrows.

Figure 4:
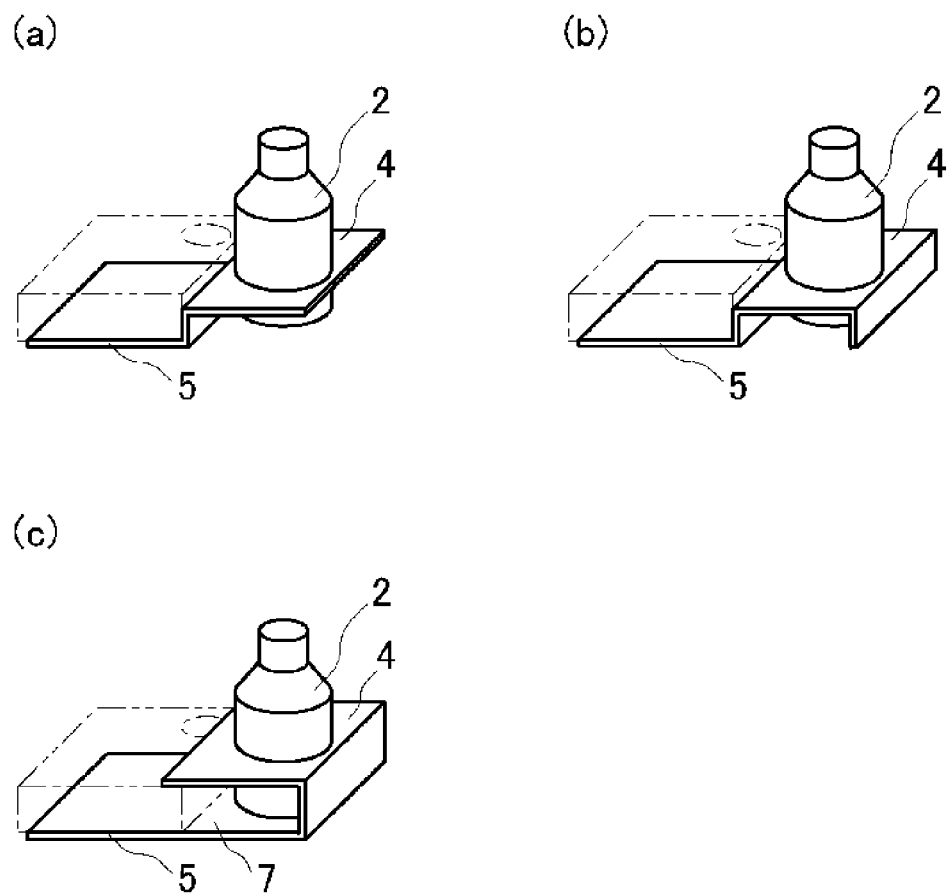
FIGS. 4A to 4C are perspective views further illustrating other examples of embodiments of the tire repair device of the present technology.
Figure 5:
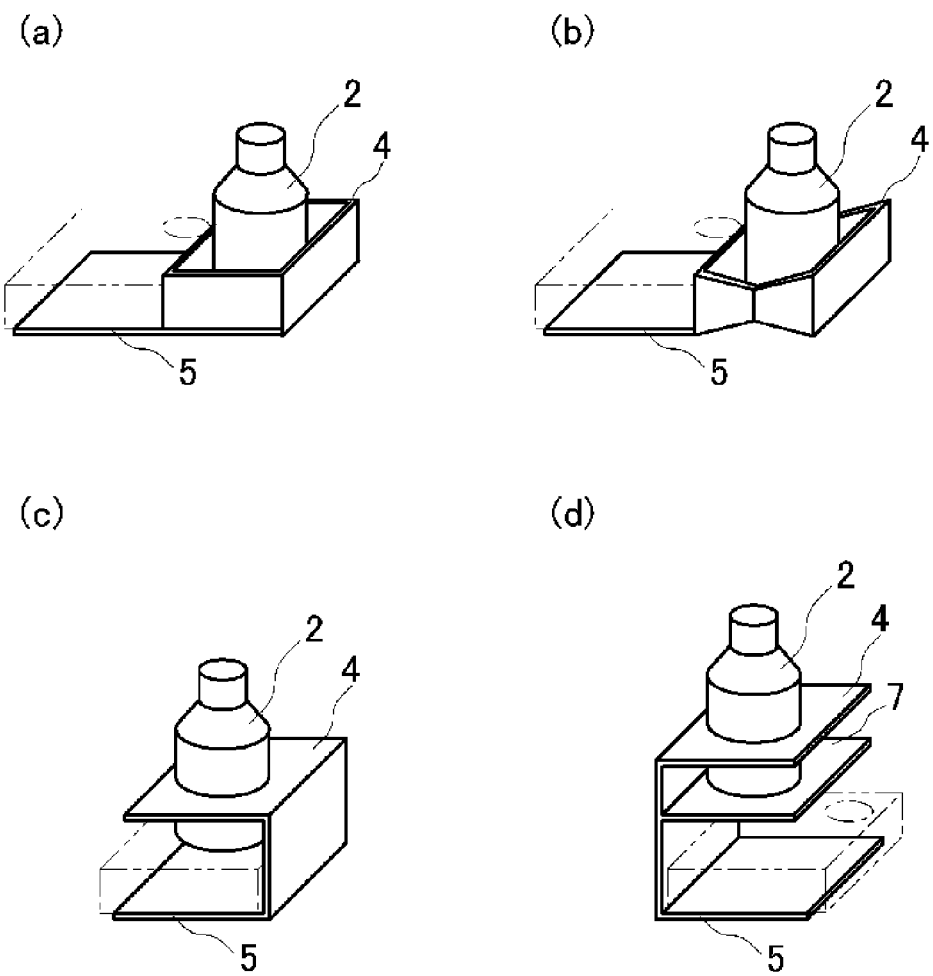
FIGS. 5A to 5D are perspective views further illustrating other examples of embodiments of the tire repair device of the present technology.
Figure 6:
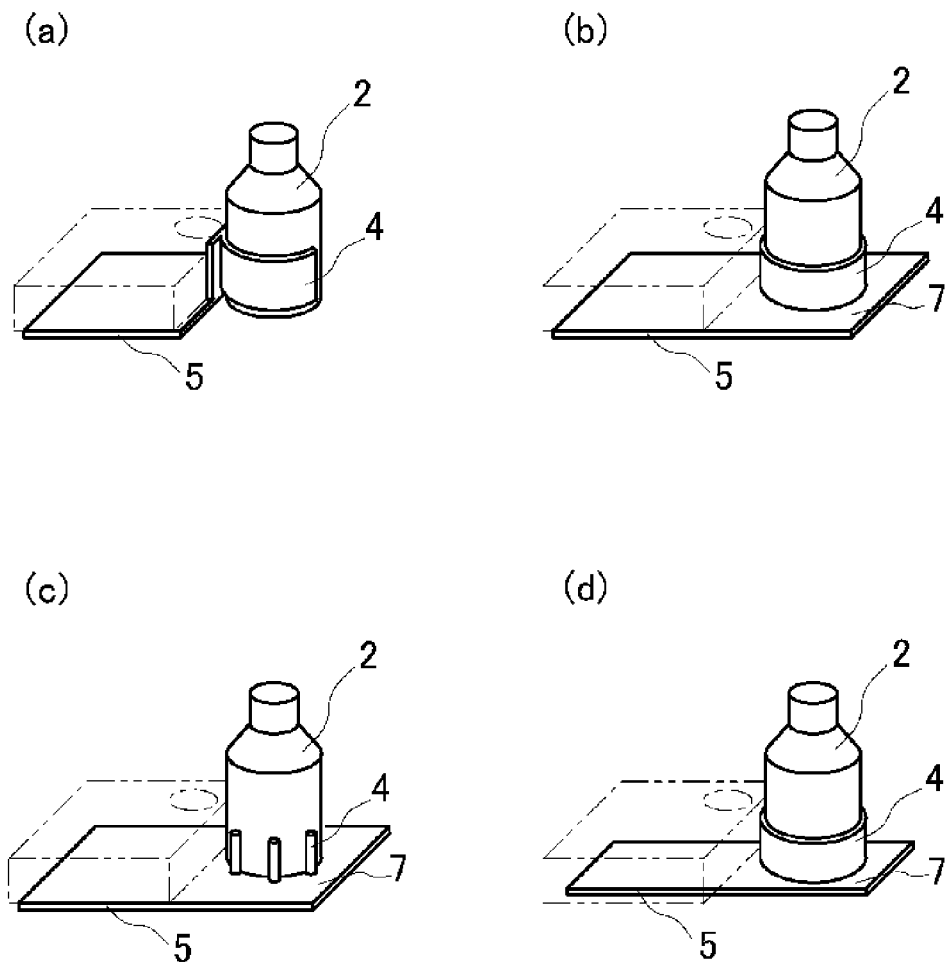
FIGS. 6A to 6D are perspective views further illustrating other examples of embodiments of the tire repair device of the present technology.

As illustrated in FIG. 2B, the securing jig 3 may be configured from a plurality of flat members configured by folding one plate a plurality of times. In this case, the step plate portion 5 can be made from a flat member at one end portion of the plate. The container can be inserted by providing the hole 6 in one of the plurality of flat members. The flat member provided with the hole 6 is a flat member different from the flat member that becomes the step plate portion 5, and one or more flat members may be provided between the flat member provided with the hole 6 and the flat member that becomes the step plate portion 5. As illustrated in FIGS. 4A or 4C below, the flat member provided with the hole 6 may be a flat member at the end portion of the plate on the side opposite the step plate portion 5.

As illustrated in the above drawings, the end portion of the plate on the side opposite the step plate portion 5 may be the base portion 7 among the plurality of flat members. The flat member that becomes the base portion 7 is not limited to being an end portion of the plate, and an end portion side of one flat member may be the step plate portion 5 and the remaining part on the inside may be used as the base portion 7 as illustrated in FIG. 4C described below for example.

A height h of the securing portion 4 of the securing jig of the present technology illustrated in FIG. 1B is preferably from 20 to 90% or more preferably from 40 to 65% of a height H of the container 2 when held in the predetermined direction. If the height h of the securing portion 4 is less than 20% of the container height H, there is a concern that when there is a large amount of repair liquid inside the container 2, that is, during the initial stage of the tire repair fluid injection, the container 2 may not be held in a stable manner. If the height h of the securing portion 4 is greater than 90% of the container height H, there is a concern that when there is a small amount of repair liquid inside the container 2, that is, during the final stage of the tire repair fluid injection, the container 2 may not be held in a stable manner.

The height H of the container 2 is the height of the container when the container 2 is being held in the predetermined direction as illustrated in FIG. 1A. As described above in regard to the predetermined direction for holding the container 2, when the cylindrical container 2 is being held for example in a substantially horizontal manner, the height would be the outer diameter of the container 2.

FIGS. 3 to 6 exemplify outlines of the container 2 held in the securing portion 4 as other embodiments of the tire repair device of the present technology, and the compressor placed on the step plate portion 5 is represented by a two-dot chain line.

FIG. 3A illustrates an example in which the length in a projection direction of the step plate portion 5 in the tire repair device illustrated in FIG. 1C is reduced. FIG. 3B illustrates an example in which the length in the projection direction of the step plate portion 5 is reduced even more. FIG. 3C illustrates an example in which the width of the step plate portion 5 in the tire repair device illustrated in FIG. 1C is reduced. FIG. 3D illustrates an example in which the step plate portion 5 with a reduced width is disposed as two plates. In any of these cases, the container 2 can be held in a stable manner while injecting the tire repair fluid due to an object such as a compressor being placed on the step plate portion 5.

While the surface area of the step plate portion 5 in the present technology is not limited in particular, the surface area, for example, is preferably at least 30% or more preferably from 100% to 300% of the bottom surface area of the container 2. By making the surface area of the step plate portion 5 30% or more, the securing jig and the container can be secured in a stable manner.

FIG. 3E illustrates an example in which the height h of the securing portion 4 in the tire repair device illustrated in FIG. 1C is increased, and FIG. 3F illustrates an example in which the height h of the securing portion 4 is increased even more.

The tire repair devices in FIGS. 4A and 4B are examples of simplified forms of the securing portion 4 of the tire repair device in FIG. 1C. These examples illustrate the securing jig 3 with the base portion 7 of the securing portion 4 in FIG. 1C removed. The weight of the securing jig 3 can be reduced due to these simplified forms. Moreover, the volume when folded can be reduced further.

FIG. 4C is an example in which an upper side member of the securing portion 4 is placed on the upper surface of the compressor, and the container 2 can be held in a stable manner due to the container 2 being sandwiched between a side surface of the compressor and a side surface of the securing portion 4. In this embodiment, the flat member of the end portion of the plate is used for both the step plate portion 5 and the base portion 7 as described above, and the step plate portion 5 occupies the end portion side and the base portion 7 occupies the inside of the flat member.

The tire repair device in FIG. 5A is an example in which the shape of the securing portion 4 is formed as a box, and FIG. 5B is an example in which the shape of the securing portion 4 is formed as a frame. Further, the tire repair device in FIG. 5C has an upper surface side member provided with a hole for mounting the container 2 as the securing portion 4, and a bottom surface side member as the step plate portion 5, and the securing portion 4 and the step plate portion 5 are disposed so as to face each other. The container 2 can be held in a stable manner by placing the compressor on the step plate portion 5 and placing the container 2 inserted into the hole in the securing portion 4 on the compressor. The tire repair device in FIG. 5D is a modified example of FIG. 5C, and is an example in which a supporting member for placing the container 2 is provided between a member on the upper surface side having the hole and the step plate portion 5.

The tire repair device in FIG. 6A is an example in which the shape of the securing portion 4 is configured with a supporting member that is curved along the outer periphery of the container 2 so as to cover both sides of the outer periphery of the container 2. The tire repair device in FIG. 6B is an example in which a first side of one plate is the securing portion 4 and a second side is the step plate portion 5, and the plate of the securing portion 4 has disposed thereon a holding frame made up of a cylindrical-shaped projecting part into which the outer diameter of the container 2 is fitted. The tire repair device in FIG. 6C is an example in which a first side of one plate is the securing portion 4 and a second side is the step plate portion 5, and the plate of the securing portion 4 has disposed thereon a plurality of rod-shaped projecting parts facing upward around the outer periphery of the container 2. With any of these cases, the container 2 can be secured in a stable manner. The tire repair device in FIG. 6D is a modified example in which the width of the securing jig 3 is reduced in the tire repair device in FIG. 6B.

Figure 7:
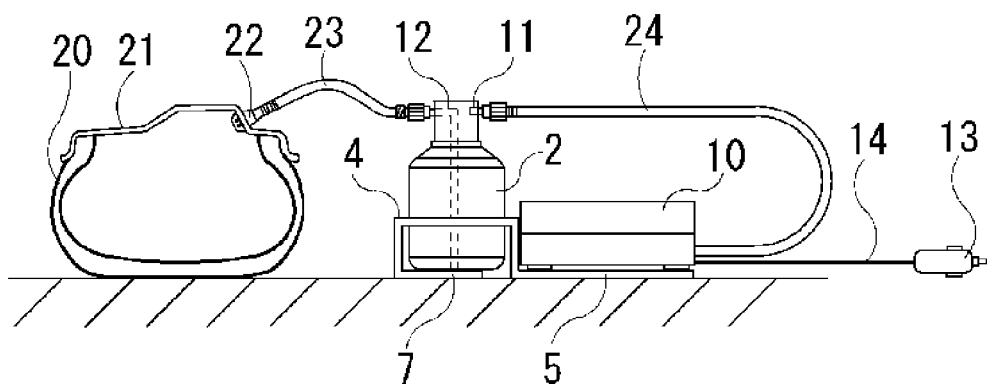
FIG. 7 is a schematic view exemplifying an embodiment of a tire repair method of the present technology.
Figure 8:
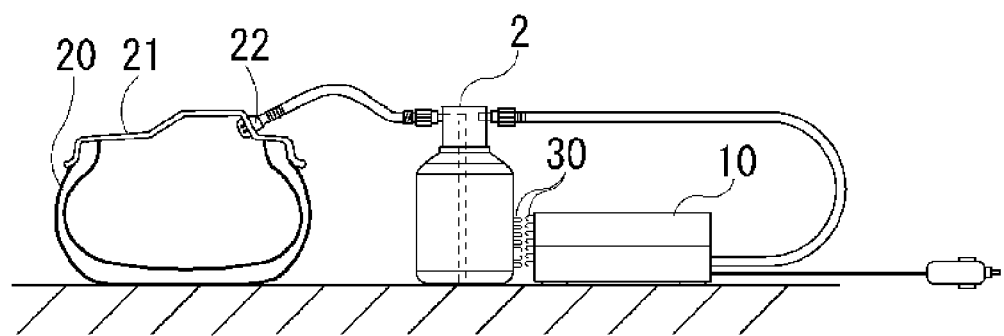
FIG. 8 is a schematic view exemplifying an embodiment of a conventional tire repair method.

FIG. 7 is a schematic view exemplifying an embodiment of a tire repair method of the present technology.

The tire repair method involves first removing a sealing member that seals the opening of the container 2 and then mounting an intake pipe 11 and a discharge pipe 12. The intake pipe 11 is a pipe connected to a compressor for introducing compressed air into the container 2. The discharge pipe 12 is a pipe for exhausting both the tire repair fluid and the compressed air from the inside to the outside of the container 2.

Further, the discharge pipe 12 is connected to a tire valve 22 of a wheel 21 assembled onto a tire 20 with an injection hose 23, and the compressor 10 is connected to the intake pipe 11 with a pressurization hose 24.

Next, the container 2 is inserted into the hole and placed on the base portion 7 so that the container 2 faces a predetermined direction in the securing portion 4 of the securing jig. The compressor is placed and secured on the step plate portion 5 of the securing jig. A plug 13 at the distal end of a cord 14 of the compressor 10 is connected to an external power source to activate the compressor 10.

Due to activation of the compressor 10, the compressed air passes through the pressurization hose 24 and the intake pipe 11 to be compacted inside the container 2. As a result, since the inside of the container 2 is compressed, the tire repair fluid and the compressed air pass through the discharge pipe 12, the injection hose 23, and the tire valve 22 to be injected into the inside of the tire 20.

By mounting the container 2 in the securing jig 3 in the method of the present technology, the tire repair fluid can be injected in a stable manner from when there is a large amount of the tire repair fluid inside the container 2 at the start of injection until the tire repair fluid inside the container 2 is almost finished at the end of injection, because the container 2 is held in the predetermined direction.

EXAMPLES

Working Example 1

The tire repair method illustrated in FIG. 7 is implemented using the tire repair device illustrated in FIG. 1. The tire repair fluid container is a plastic container with a wall thickness of approximately 2.0 mm and the volume of the tire repair fluid is 450 ml. The securing jig was formed of the thick paper (thickness approximately 0.7 mm) the outer surface of which was coated with polypropylene so that the height h of the securing portion is 40% of the container height H of the container, the surface area of the step plate portion is 150% of the bottom surface area of the container. The tire repair fluid container was secured facing upward by placing a compressor (weight approximately 800 g) on the step plate portion.

In a working environment with an ambient temperature of 23° C., the air pressure (gauge pressure) of a pneumatic tire having a tire size of 215/60R16 was adjusted to 0.0 kPa, compressed air (gauge pressure: 400 kPa) supplied from the compressor was supplied to the tire repair fluid container secured facing upward, and the tire repair fluid and the compressed air inside the container were injected into the tire. As a result, injection was completed in approximately 25 seconds. The container and the securing jig were secured in a stable manner from start to finish of the injection of the tire repair fluid and the tire repair fluid was injected easily and in a stable manner.

Working Example 2

Except for making the height h of the securing portion of the securing jig 60% of the container height H, the injection of the tire repair fluid was implemented in the same way as Working Example 1. As a result, injection was completed in approximately 26 seconds. The container and the securing jig were secured in a stable manner from start to finish of the injection of the tire repair fluid and the tire repair fluid was injected easily and in a stable manner.

What is claimed is:

1. A tire repair device, comprising: a container for containing tire repair fluid; and a securing jig for securing the container, the securing jig being configured by coupling a securing portion for holding the container in a predetermined direction to a step plate portion, wherein
the securing jig is made up of a plurality of flat members configured by folding a flat plate a plurality of times, so that all of the fold lines are arranged substantially parallel, and the step plate portion is a flat member of an end portion of the flat plate.

2. The tire repair device according to claim 1 wherein the securing jig is expandable on a flat surface or foldable.

3. The tire repair device according to claim 1, wherein the securing portion of the securing jig has a hole into which the container is insertable in one of the plurality of flat members.

4. The tire repair device according to claim 1, wherein the securing jig has a base portion for placing the container on one of the plurality of flat members.

5. The tire repair device according to claim 1, wherein a height h of the securing portion of the securing jig is from 20 to 90% of a height H of the container when held in a predetermined direction.

6. A tire repair method using a tire repair device having a container for containing a tire repair fluid and a securing jig for securing the container, the securing jig being configured by coupling a step plate portion and a securing portion for holding the container in a predetermined direction, the method comprising the steps of: connecting to the container a discharge pipe for discharging the tire repair fluid and an intake pipe for introducing compressed air; mounting the container onto the securing portion and securing the securing jig and the container by placing a compressor on the step plate portion; connecting the discharge pipe to a tire valve of a wheel assembled on a tire with an injection hose; connecting the compressor to the intake pipe of the container; and supplying compressed air from the compressor to the container, whereby the inside of the container is compressed and the tire repair fluid is injected into the tire, wherein
the securing jig is made up of a plurality of flat members configured by folding a flat plate a plurality of times, so that all of the fold lines are arranged substantially parallel, and the step plate portion is a flat member of an end portion of the flat plate.

7. The tire repair method according to claim 6 wherein the securing jig is expandable on a flat surface or foldable.

8. The tire repair method according to claim 6, wherein the securing portion of the securing jig has a hole into which the container is insertable in one of the plurality of flat members.

9. The tire repair method according to claim 6, wherein the securing jig has a base portion for placing the container on one of the plurality of flat members.

10. The tire repair method according to claim 6, wherein a height h of the securing portion of the securing jig is from 20 to 90% of a height H of the container when held in a predetermined direction.

11. The tire repair device according to claim 3, wherein the securing jig has a base portion for placing the container on one of the plurality of flat members.

12. The tire repair device according to claim 11, wherein a height h of the securing portion of the securing jig is from 20 to 90% of a height H of the container when held in a predetermined direction.

13. The tire repair device according to claim 2, wherein a height h of the securing portion of the securing jig is from 20 to 90% of a height H of the container when held in a predetermined direction.

14. The tire repair method according to claim 8, wherein the securing jig has a base portion for placing the container on one of the plurality of flat members.

15. The tire repair method according to claim 7, wherein a height h of the securing portion of the securing jig is from 20 to 90% of a height H of the container when held in a predetermined direction.

16. The tire repair method according to claim 8, wherein a height h of the securing portion of the securing jig is from 20 to 90% of a height H of the container when held in a predetermined direction.

* * * * *